United States Patent
Rockenbeck et al.

(10) Patent No.: US 7,529,671 B2
(45) Date of Patent: May 5, 2009

(54) BLOCK SYNCHRONOUS DECODING

(75) Inventors: William H. Rockenbeck, Redmond, WA (US); Julian J. Odell, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1121 days.

(21) Appl. No.: 10/379,244

(22) Filed: Mar. 4, 2003

(65) Prior Publication Data

US 2004/0176956 A1    Sep. 9, 2004

(51) Int. Cl.
*G10L 15/14* (2006.01)
(52) U.S. Cl. .................. 704/256; 704/256.1; 704/256.5
(58) Field of Classification Search ...... 704/256–256.6, 704/254, 231, 235, 242, 246, 240, 250, 251, 704/236, 243
See application file for complete search history.

(56) References Cited

U.S. PATENT DOCUMENTS

| | | | | |
|---|---|---|---|---|
| 5,621,859 | A | * | 4/1997 | Schwartz et al. ............ 704/256 |
| 6,092,045 | A | * | 7/2000 | Stubley et al. .............. 704/254 |
| 2002/0042710 | A1 | | 4/2002 | Gong ........................ 704/256 |

FOREIGN PATENT DOCUMENTS

CN    1301379 A    6/2001

WO    WO 02/29612    4/2002

OTHER PUBLICATIONS

Robinson, et al., "Time-First Search for Large Vocabulary Speech Recognition," In Proc. ICASSP, 4 pages (1998).
The Official Search Report from foreign application No. 04002695.7, filed Feb. 6, 2004.
Miyazawa et al., "Unsupervised Speaker Adaptation Using All-Phoneme Ergodic Hidden Markov Network," IEICE Transactions on Information and Systems, Information and Systems Society, Tokyo, Japan, Aug. 8, 1995.
Wang et al., "Unsupervised Analysis of Human Gestures," IEEE Pacific Rim Conference on Multimedia, 2001, pp. 174-181.
Database Inspec [Online], The Institution of Electrical Engineers, Oliver et al., "Layered Representations for Human Activity Recognition," 2002 (Abstract).
First Office Action from Chinese patent application No. 200410028644.8, dated Jan. 9, 2009.

* cited by examiner

*Primary Examiner*—Huyen X. Vo
(74) *Attorney, Agent, or Firm*—Christopher R. Christenson; Westman, Champlin & Kelly, P.A.

(57) ABSTRACT

A pattern recognition system and method are provided. Aspects of the invention are particularly useful in combination with multi-state Hidden Markov Models. Pattern recognition is effected by processing Hidden Markov Model Blocks. This block-processing allows the processor to perform more operations upon data while such data is in cache memory. By so increasing cache locality, aspects of the invention provide significantly improved pattern recognition speed.

4 Claims, 6 Drawing Sheets

BLOCK SYNCHRONOUS DECODING

BACKGROUND OF THE INVENTION

The present invention relates to pattern recognition. In particular, the present invention relates to processing signals used in pattern recognition.

A pattern recognition system, such as a speech recognition system, takes an input signal and attempts to decode the signal to find a pattern represented by the signal. For example, in a speech recognition system, a speech signal (often referred to as a test signal) is received by the recognition system and is decoded to identify a string of words represented by the speech signal.

To decode the incoming test signal, most recognition systems utilize one or more models that describe the likelihood that a portion of the test signal represents a particular pattern. Examples of such models include Neural Nets, Dynamic Time Warping, segment models, and Hidden Markov Models (HMMs).

Most commercially-available speech recognition systems use HMMs to match speech patterns in speech which is divided into overlapping "frames", often separated from one another by approximately ten milliseconds. Decomposing speech into these ten millisecond frames is just one example of an input being transformed into a series of time-sequenced frames. Traditionally, evaluation of these frames takes place one frame at a time; all HMMs are updated for a single frame in round-robin fashion before moving on to the next frame.

Figure 3:
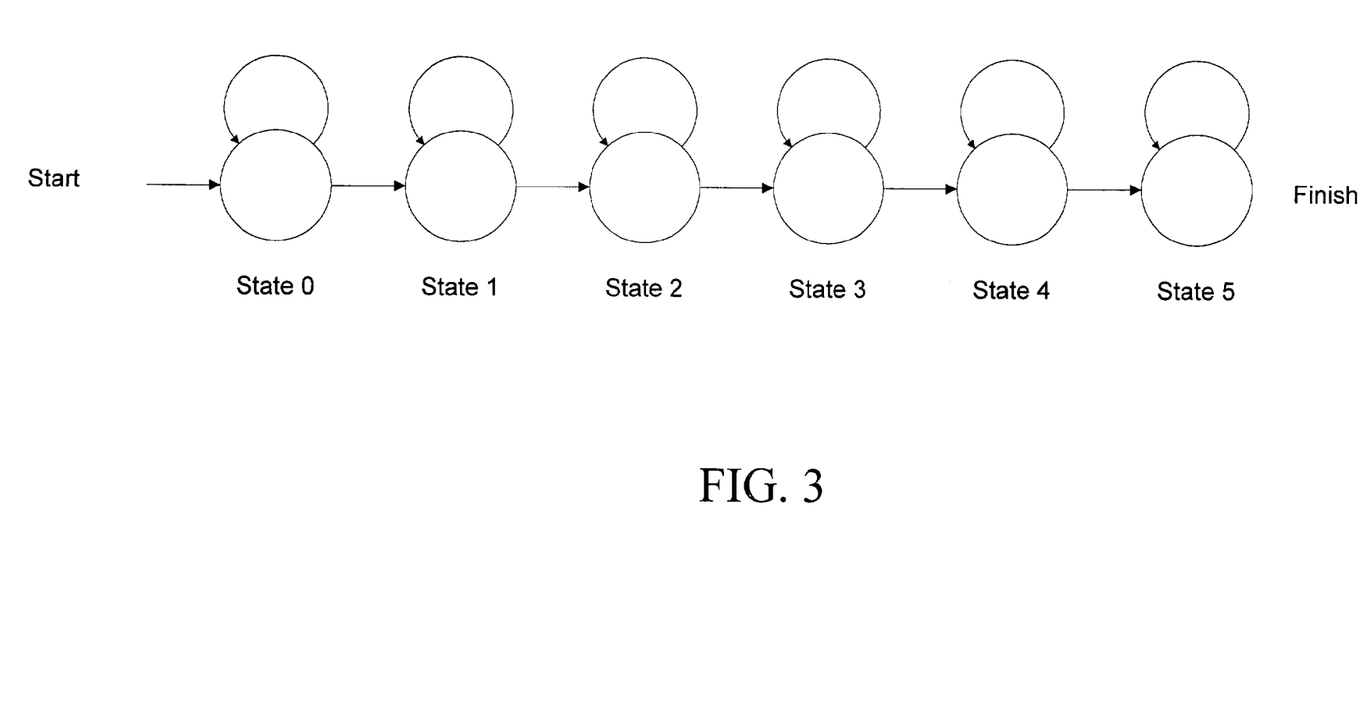
FIG. 3 is a diagrammatic view of a six-state HMM.

FIG. 3 illustrates a basic representation of an HMM, as described in detail in many texts including, for example, Chapter 8 of *Spoken Language Processing*, by Huang, Acero and Hon. At any given time, the model has a given probability of being in any of the various states. Each state has an output probability distribution and transition probabilities to other states. In the case of speech, the output distribution models an acoustic feature set derived from raw speech waveforms broken into the 10 millisecond frames. These transition and output probabilities are generated by a training step in accordance with known techniques.

Figure 4:
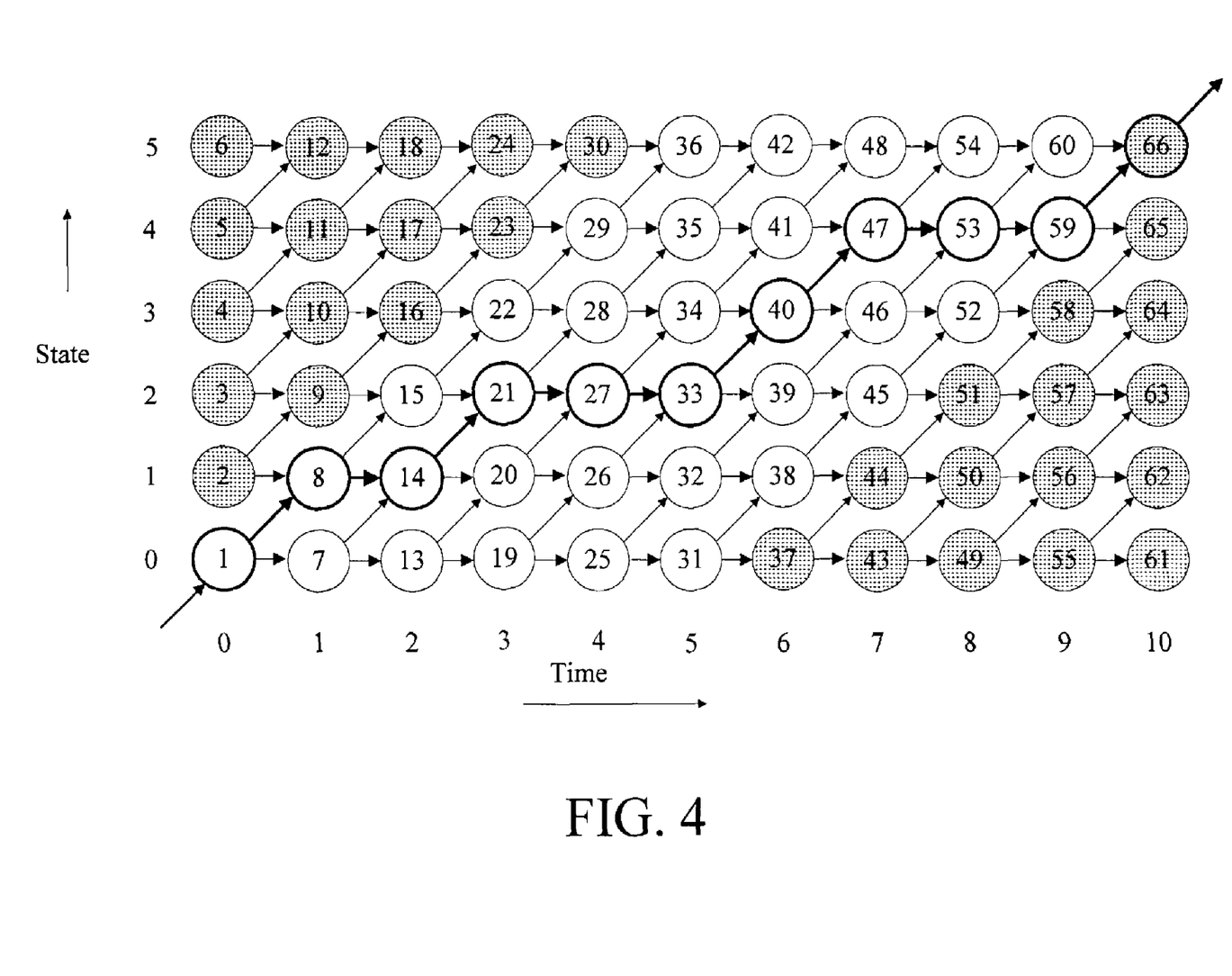
FIG. 4 is a diagrammatic view of the six-state HMM of FIG. 3 illustrated with time as the horizontal axis.

The decoding problem for HMMs is, given an HMM and a sequence of observations, what is the most likely state sequence that produces the sequence of observations? The standard method of solving this problem is called Dynamic Programming and is illustrated in FIG. 4. The six-state HMM described with respect to FIG. 3 has been turned on its side, and time runs along the horizontal axis. Each "point" (a combination of state and time) in this grid represents a probability that the HMM is in that state at that time, given the observations. One possible path through the DP matrix is highlighted in bold (1-8-14-21-27-33-40-47-53-59-66), representing a particular alignment or state sequence. The probability for a point depends on the probabilities of the previous points, on the transition probabilities and on the output probabilities for that time step. Since each point depends on several previous points, calculating the probability for that point requires having first calculated the previous points, thereby placing limits on the order of calculation. A "time-synchronous" evaluation order is shown in FIG. 4 by the numbers within the points; the system evaluates all states for a given time step before starting again with the next time step. Note, this is not the only possible evaluation order since any order that calculates a point only after its predecessors have been calculated is allowable. The gray points illustrate states that are either unreachable or do not lead to possible finish states and so do not need to be evaluated, although many implementations evaluate them anyway.

In a real-time system, there may be tens of thousands of such HMMs running at the same time. These models consume enough computer memory that each pass through the entire model set often exhausts the CPU cache capacity. This slows speech processing considerably since memory operations involving solely CPU cache occur many times faster than memory operations involving higher level memory.

Another method of solving the problem is described in a paper entitled *Time-First Search For Large Vocabulary Speech Recognition*, by Tony Robinson and James Christie. This method essentially switches the order of HMM evaluation from evaluating multiple models for a given time frame, to evaluating multiple time frames for a given model. This method purports to reduce processing memory requirements while cooperating with standard CPU memory cache operations because a number of operations fall into the same physical memory range.

In order to provide real-time continuous speech recognition for large vocabulary applications, further developments are required to improve not only the efficiency of CPU cache use, but the efficiency of the processing routine itself. Thus, not only is processing speed of critical importance, but processing accuracy as well.

SUMMARY OF THE INVENTION

A pattern recognition system and methods are provided. Aspects of the invention are particularly useful in combination with multi-state Hidden Markov Models. Pattern recognition can be effected by processing Hidden Markov Model Blocks. This block-processing allows the processor to perform more operations upon data while such data is in cache memory. By so increasing cache locality, aspects of the invention provide significantly improved pattern recognition speed.

DETAILED DESCRIPTION OF ILLUSTRATIVE EMBODIMENTS

Figure 1:
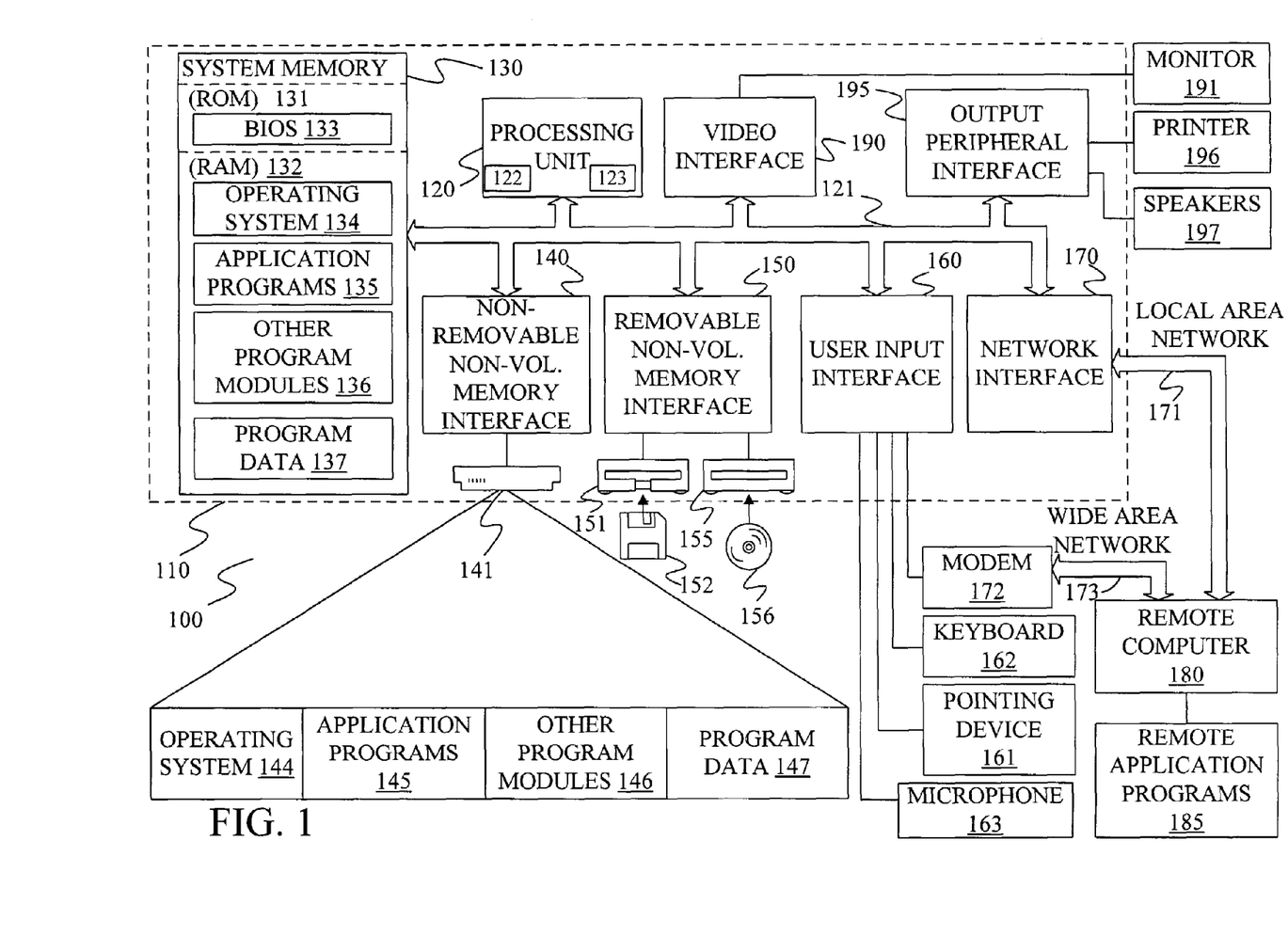
FIG. 1 is a block diagram of one computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a central processing unit 120, which includes cache memory 122 (Level 1 Cache) and cache memory 123 (Level 2 Cache), a system memory 130, and a system bus 121 that couples various system components including the system memory to the processing unit 120. Cache memory increases processing speed by allowing blocks of data to be transferred from relatively slow system memory to the relatively high speed cache memory. There are currently two main types of cache memory. Level 1 cache memory is a portion of memory on a microprocessor itself. This memory is generally faster than all other memory in the system, but is also relatively expensive since it directly adds to the silicon footprint of the microprocessor. Level 2 Cache is generally located near, but not on, the microprocessor. This memory is also typically faster than system memory, but slower than Level 1 Cache memory. As a very rough guideline, Level 1 Cache can be considered to operate about an order of magnitude faster than Level 2 Cache, which still operates about an order of magnitude faster than overall system RAM. Thus, system processing speed is maximized when cache memory is used most efficiently.

The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
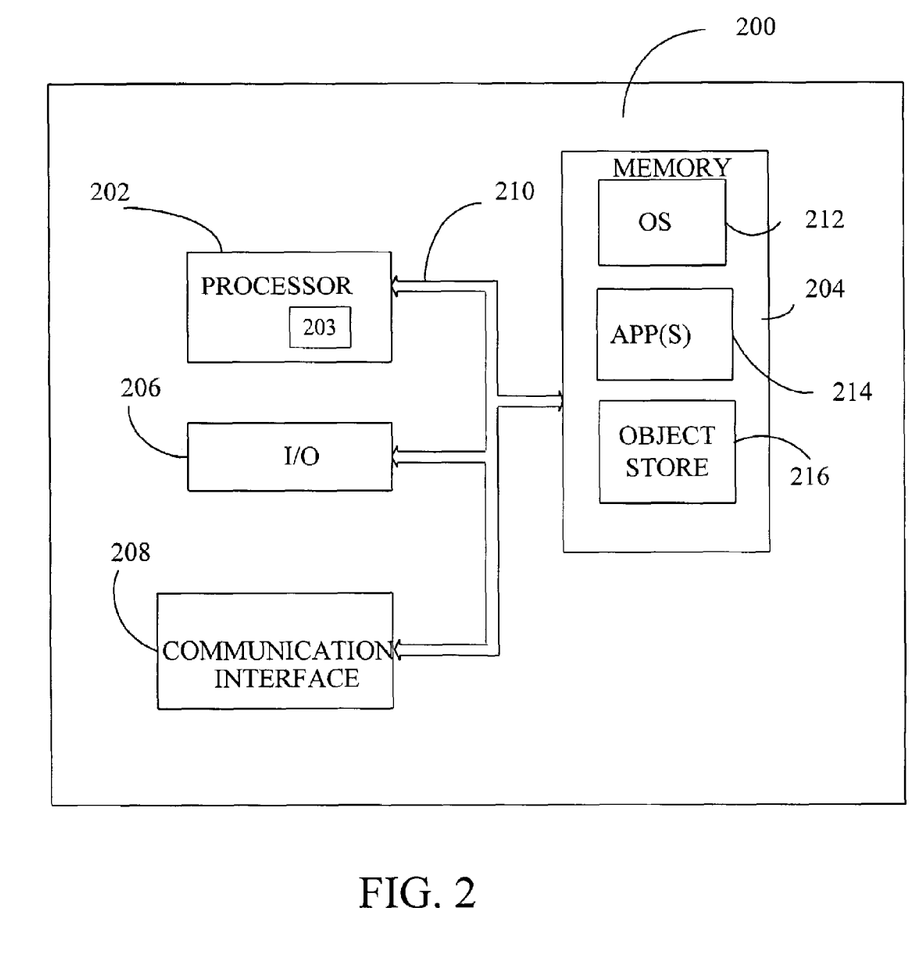
FIG. 2 is a block diagram of an alternative computing environment in which the present invention may be practiced.

FIG. 2 is a block diagram of a mobile device 200, which is an exemplary computing environment. Mobile device 200 includes a microprocessor 202, including cache memory 203, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Under one aspect of the present invention, a system and method are provided which adapt HMM processing to significantly increase system cache locality. Accordingly, a greater number of HMM operations are performed before the system cache is flushed. Thus, fewer calls are made to general system memory than were required in the past. Accordingly, processing speed is increased significantly. While these improvements will be described with respect to speech processing, embodiments of the present invention can be practiced to improve processing for any form of pattern recognition that uses HMMs.

Figure 5:
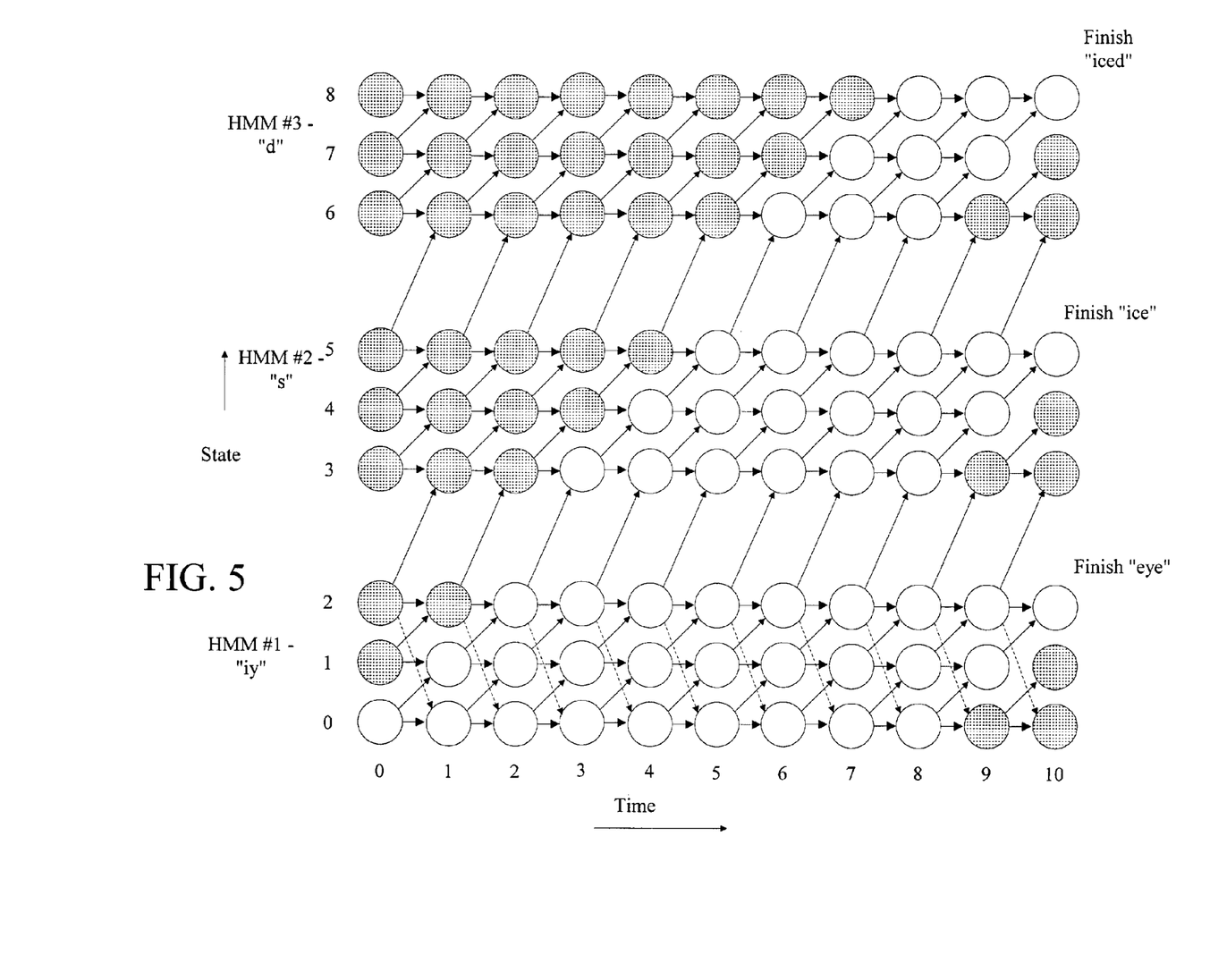
FIG. 5 is a diagrammatic view of a trio of three-state HMMs.
Figure 6:
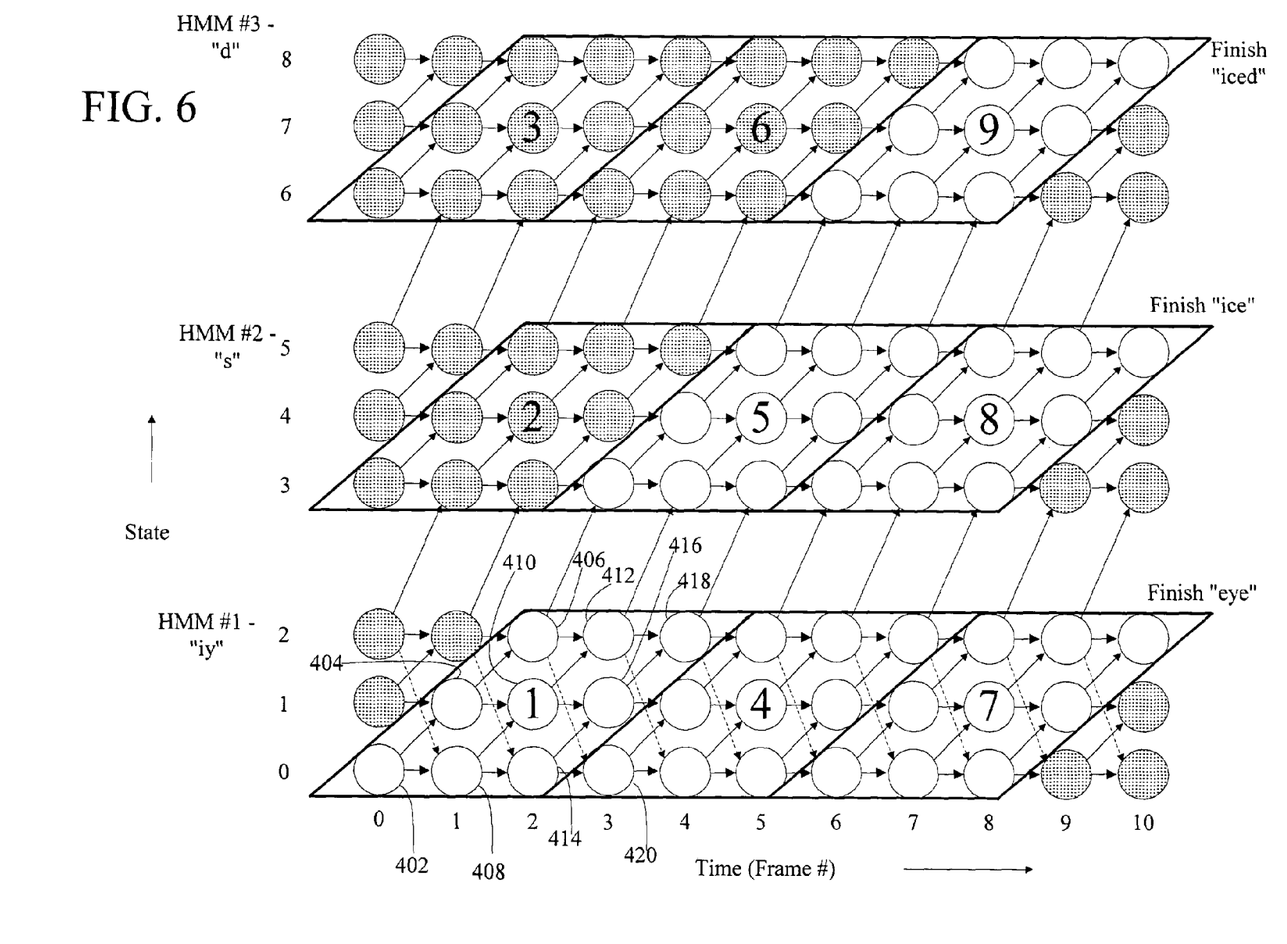
FIG. 6 is a diagrammatic view of Hidden Markov Model Blocks (HMMBs) in accordance with an embodiment of the present invention.

Some models that are useful for modeling speech use a specific HMM topology known as "three-state left-to-right without skipping". This topology is illustrated in FIGS. 5 and 6. Embodiments of the present invention essentially reorder HMM evaluation such that three frames are evaluated for a single HMM before evaluating another HMM. This significantly improves cache locality and thus increases processing speed.

FIG. 6 illustrates the model of FIG. 5 grouped into Hidden Markov Model Blocks (HMMBs). Each bolded rhombus 400 indicates an HMMB that corresponds to a speech unit (i.e. a phoneme). In each HMMB, an identical number of frames of each state are provided. Thus, in HMMB #1 there are three frames of state 0, three frames of state 1, and three frames of state 2. While it is believed that advantages of embodiments of the present invention can be realized with the number of frames differing from the number of states in the HMM, it is preferred that the number of frames equal the number of HMM states. Additionally, the rhombus shape occurs because any given point can only be evaluated once its previous points are evaluated, as discussed above. The size of the HMMBs shown in FIG. 6 was selected to match the number of states employed (three-state left-right HMMs). It is contemplated that different HMM topologies could give rise to different-shaped HMMBs, which fall within the spirit and scope of the invention. For example, a ten-state left-right HMM (potentially useful for some other form of pattern recognition, such as handwriting recognition) would be amenable to ten-frame HMMBs. Moreover, a sometimes-used topology which has five states may transition on each frame to itself, the next state, or the state after that. In that case, three-frame HMMBs are still usable (since any input to the HMM will take at least three frames to reach the output), but the shape of the HMMB would be three frames "wide" by five states "high".

In accordance with embodiments of the present invention, each HMMB is evaluated as a unit. As used herein, an HMMB is a subset of all points in an HMM processing system. The block includes at least two points that differ from one another in both time and state. Evaluation of each HMMB depends solely on the output of previous HMMBs.

Each HMMB includes inter-block entry points, intra-block entry points, inter-block exit points, and intra-block exit points. Referring to FIG. 6, points 402, 408 and 414 are inter-block entry points in that they can receive scores or values from other HMMBs. Points 402, 404 and 406 are intra-block entry points in that they can receive scores from a previous block in the same HMM. With respect to block 4, block 1 would be considered a previous block in the same HMM. Note, point 402 is not only an inter-block entry point, but an intra-block entry point as well. Points 406, 412 and 418 are inter-block exit points since they can provide their values to inter-block entry points of other blocks, such as block 5. Finally points 414, 416 and 418 can be considered intra-block exit points.

Before processing of a block begins, scores for the best paths ending at the inter-block entry points and intra-block entry points have been previously determined. In addition, a pointer to a preceding state along this best path has been stored in the entry point.

Processing of a block begins with the point that is first in time. In FIG. 6, that point is numbered 402. Point 402 is processed by multiplying its score by the transition probability for each point that can be transitioned from point 402 (404, 406). This score is then compared to the existing value of the transitioned point, to determine whether the score through point 402 is higher than the existing score of the transitioned point. If so, the transitioned point is updated to reflect the new maximum and a pointer associated with point 402 is set.

Once point 402 is processed, point 404 can be processed. Processing of point 404 is relatively straightforward in that point 404 is initially set to the greater of the corresponding intra-block exit point from the immediately preceding block in the same HMM and the score from block 402. Point 406 is processed similarly to point 404. However, since point 406 is an inter-block exit point, its score will be used to update some inter-block entry points of other blocks.

Point 408 can also be processed once point 402 is processed. The relative order of processing between point 404 and point 408 is a matter of design choice. Point 408 is processed somewhat similarly to point 402 in that prior to processing, it takes the maximum score among point 402, in combination with its transition probability, and all exit points that can conceivably connect to point 404. Again, a pointer, or other suitable record, is set to indicate the point that generated the maximum score. Processing point 408 includes multiplying its score by the transition probabilities through which it can transition to potentially update the values of points 410 and 414.

Points 410, 412, 416 and 418 are processed similarly to points 404 and 406. Further, processing of point 414 is similar to that set forth above with respect to point 408.

Once all processing within block 1 is complete, exit score processing is performed. Specifically, for each inter-block exit point, the language model is consulted. The language model sets forth which transitions are allowable, as well as the transition probabilities for transitioning between speech units. Thus, for example, the language model will indicate the allowability and probability of transitioning from the speech unit of block 1, to other speech units. This probability is then combined with the score of inter-block exit points, such as point 406, to determine if the combination is greater than scores existing in any allowable (by virtue of the language model) inter-block entry points in the next time frame. If the combination is indeed greater, the inter-block entry point is updated to reflect a new maximum, and an associated pointer, or other suitable record, is set. This process is repeated for inter-block exit points 412 and 418. Note, as indicated by the dashed lines in FIG. 6, inter-block exit points can also connect to inter-block entry points of the next block in time for the same speech unit (i.e. 406 connects to 420).

Points 416 and 418 provide their scores to the intra-block entry points of the next block in time for the same speech unit. Finally, point 420 is processed as described above with respect to point 402, and the process continues on to the next block.

Once processing of block 1 is complete, processing of a block corresponding to another speech unit preferably begins. An exemplary block processing order is set forth in FIG. 6 as block 1-2-3-4-5-6-7-8-9. However, other orders can be practiced without departing from the scope of the invention. Note, some of the points are grayed indicating that they are either unreachable, or do not lead to possible finish states. Additional processing efficiency can be achieved by not actually processing such points.

Although the present invention has been described with reference to particular embodiments, workers skilled in the art will recognize that changes may be made in form and detail without departing from the spirit and scope of the invention.

What is claimed is:

1. A method of recognizing patterns in an input formed of time-sequenced frames, the method comprising:
   receiving a plurality of input speech signals;
   converting the plurality of input speech signals into a plurality of time-sequenced frames;
   modeling patterns with a plurality of tri-state Hidden Markov Models; and
   processing with a processor of a computing device, Hidden Markov Model Blocks (HMMBs) to recognize the modeled patterns among the time-sequenced frames to generate a sequence of recognized modeled patterns, wherein each HMMB is a three by three rhombus when depicted on a state vs. time chart.

2. The method of claim 1, wherein the time-sequenced frames correspond to speech.

3. The method of claim 1, wherein processing each block includes interacting solely with system cache memory.

4. The method of claim 1, wherein processing the HMMBs includes accessing a language model.

* * * * *